July 24, 1962  A. J. CLEVEN  3,045,713
METHOD OF MAKING GRIDS FOR ELECTRON DISCHARGE
TUBES AND A GRID MADE BY SAID METHOD
Filed April 8, 1958

INVENTOR
ANTOON JOHANNES CLEVEN
BY
AGENT 3,045,713
METHOD OF MAKING GRIDS FOR ELECTRON DISCHARGE TUBES AND A GRID MADE BY SAID METHOD
Antoon Johannes Cleven, Eindhoven, Netherlands, assignor to North American Philips Company, Inc., New York, N.Y., a corporation of Delaware
Filed Apr. 8, 1958, Ser. No. 727,136
Claims priority, application Netherlands Apr. 18, 1957
1 Claim. (Cl. 140—71.5)

The present invention concerns a method for making grids for use in electron-discharge tubes or the like, and to grids made by means of this method, more particularly a method of making grids intended for use in electron-discharge tubes or the like, by winding wire on at least one grid backbone which is provided with notches accommodating the grid wire, the notches being subsequently peened over the grid wire. After winding a grid, the wire is broken from the backbone, subsequent to which the broken end of the wire separated from the grid winding is again wound on the backbone at some distance from the grid just wound to commence the winding of a second grid on the same backbones spaced from the prior grid winding.

Such a method is known (for example British patent specification 743,828).

In carrying out this method, particularly when using a wire having a rather considerable stretch or with the use of grid backbones consisting of comparatively soft material, it is found that, on terminating the grid winding operation, the wire often breaks off at a point about midway between a member in the form of tongs, along which the wire is fed to the backbone, and the area where the wire leaves the backbone. The tongs or clamp suddenly interrupting the wire feed to break the wound wire defining a grid winding.

On winding a next grid, the wire end projecting beyond the tongs is often too short for starting the next winding operation (the so called winding on) as clearly illustrated in the above-noted British patent.

The present invention has for its object to obviate this drawback.

According to the invention, at least the last notch in the backbone in which the grid winding wire terminates is made deeper than the other notches of the backbones.

As a result the local deformation of the grid backbone is greater and a burr forms at the end of the notch or transversely thereof. When gripping the wire for a moment in the tongs, as in the known method, it breaks off at this burr and particularly in its immediate proximity, thus ensuring that, after breaking off, a fairly long wire end projects from the tongs to permit the next grid to be wound on.

It may be advantageous to make the first notch of a grid also slightly deeper than the adjacent notches so that the grid wire is better caught in the grid backbone and attached in winding on the grid.

However, in order to prevent prohibitive weakening and warping of the grid backbones, not all of the notches should be made deeper.

A further advantage of the deeper notches is that the ends of the grid wire are firmly secured and so remain after the commonly practiced stretching and annealing of the grid.

In order that the invention may be readily carried into effect, an example will now be described in detail with reference to the accompanying drawing, in which.

In this example, a thin wire 1 is wound on two grid backbones 2 and 3. A known method of winding is that in which the backbones 2 and 3 are moved in their direction of length according to a predetermined feed-rate, the thin grid wire being supplied from a winding head rotating about the backbones.

Figure 1:
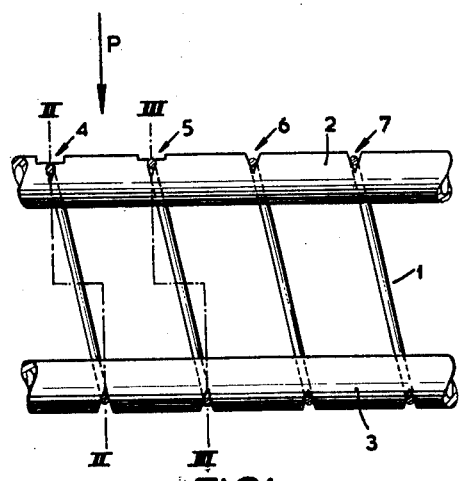
FIG. 1 is a side view of part of one form of a grid according to the invention.
Figures 2, 3:
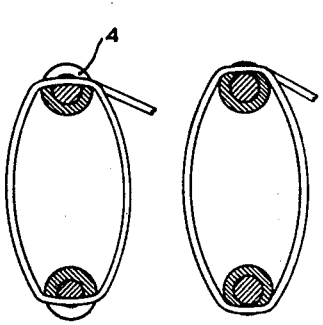
FIGS. 2 and 3 are sectional views on the lines II—II and III—III respectively in FIG. 1.

Between the backbones provision may be made of a jig (not shown) for shaping the wire turns, for example the shape as illustrated in FIGS. 2 and 3.

Figure 4:
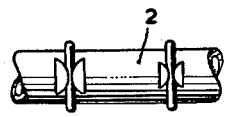
FIG. 4 is a fragmentary view of FIG. 1, viewed in the direction of the arrow P.

The drawing shows the latch notch 4 for a grid, which notch is deeper than adjacent notches 5, 6, 7 and so on. In winding, the grid wire is laid into these notches, subsequent to which the walls of the notches as are peened over the wire (see also FIG. 4) in order to secure the wire to the backbone.

The backbones may, for example, consist of a nickel core 8 and a copper sheath 9.

Figure 5:
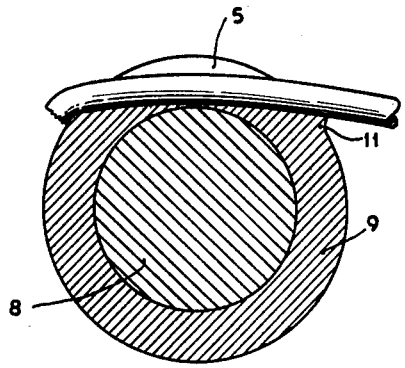
FIG. 5 is a cross-sectional view on a larger scale of a grid backbone at a shallower notch.

At the end of a deeper notch 4 (FIG. 6) a burr 10 ensues which is far more pronounced than the burr 11 at the end of a shallow notch (FIG 5).

Figure 6:
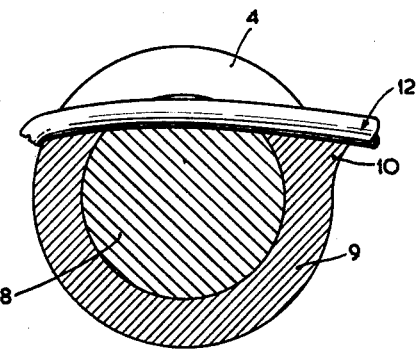
FIG. 6 is a cross-sectional view on a larger scale of a grid backbone at a deeper notch.

In winding, it is found that the wire 1 breaks off just at such a pronounced burr 10, that is to say at 12 in FIG. 6, which results in the wire end projecting beyond the wire supply tool (not shown) becoming as long as possible and eliminating difficulties in the winding on operation commencing the winding of a subsequent grid spaced from the previously wound grid along the backbone lenth.

What is claimed is:

In the method of fabricating grids for electron emission tubes in which a plurality of grids without waste turns are formed on continuous grid backbones by notching the grid backbones at spaced intervals and to a given depth to accommodate grid wire, feeding the wire to said backbones, winding said wire in said notches to form the grid winding, peening the backbones to secure said wire to said backbone and breaking the wire after the last turn of said grid winding is wound in the appropriate notch of said backbones by suddenly halting the feed of grid wire to said backbones; the improvement comprising the step of deeply cutting the last notch of the backbone within which the grid winding wire terminates to a greater depth than said given depth thereby to form an enlarged outstanding burr thereon whereby said winding wire breaks immediately adjacent said burr when the grid wire feed is halted.

References Cited in the file of this patent
UNITED STATES PATENTS

| | | |
|---|---|---|
| 2,648,797 | Werner | Aug. 11, 1953 |
| 2,719,543 | Maurer | Oct. 4, 1955 |
| 2,759,499 | Gartner | Aug. 21, 1956 |
| 2,820,487 | Bohm | Jan. 21, 1958 |
| 2,829,298 | Te Gude | Apr. 1, 1958 |
| 2,853,104 | Johnson | Sept. 23, 1958 |

FOREIGN PATENTS

| | | |
|---|---|---|
| 161,001 | Australia | Feb. 8, 1955 |